Figure 1:
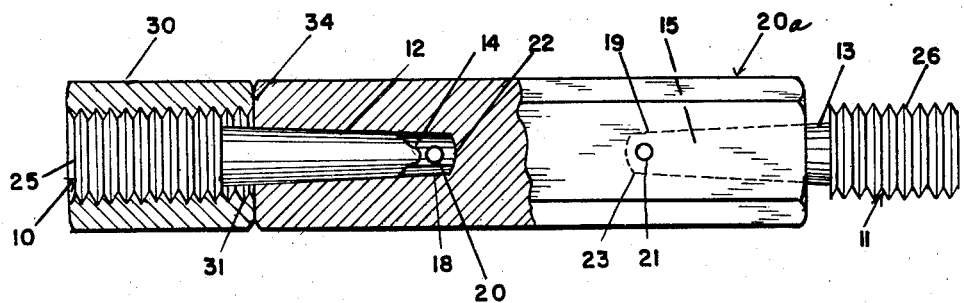

June 30, 1959     H. V. CLIFTON     2,892,259
COMBINATION PROTECTOR AND REMOVING DEVICE FOR THREAD GAUGES Filed Feb. 1, 1957

*INVENTOR.*
HARRY V. CLIFTON

BY *Charles L. Lauerdech*

ATTORNEY

United States Patent Office 2,892,259
Patented June 30, 1959

2,892,259
COMBINATION PROTECTOR AND REMOVING DEVICE FOR THREAD GAUGES

Harry V. Clifton, Erie, Pa., assignor to Clifton Automatic Screw Machine Products, Inc., Erie, Pa., a corporation of Pennsylvania Application February 1, 1957, Serial No. 637,662

1 Claim. (Cl. 33—199)

This invention relates to thread gauges and, more particularly, to protectors for thread gauges.

Thread gauges for testing female threads for accuracy are frequently made up of an accurately threaded male portion having a tapered shank integrally attached thereto. The male threaded portions of various sizes, each for testing various sizes of threaded members, usually come in sets consisting of one threaded member with a tapered shank for each particular size of threaded member to be tested. These gauges are often kept in a suitable box or other container along with a holder for holding any one of the gauges while in use. Usually, the holder is made of a hollow elongated member having a tapered hole in each end so that a different size of thread gauge may be accommodated in each end.

In order to remove a particular gauge and replace it with another size, a lateral hole is usually provided so that a drift tool or knock-out rod can be inserted laterally. The drift tool will engage the end of the tapered shank and force the tapered end of the gauge out of the tapered opening in the holder to remove it from the holder. Therefore, to remove the thread gauge from the holder, the user must first find a drift tool, insert the drift tool through the lateral hole in the handle, and find a suitable hammer to tap the drift tool.

No suitable protector has yet been provided for thread gauges whereby the protector performs the additional function of removing the gauge from the handle. The thread gauges, being precision tools, are likely to be damaged by engagement with foreign materials if they are not protected.

The present invention proposes to provide a protector for a thread gauge in the form of a hollow threaded female member made of brass, aluminum, or suitable soft metal or plastic so that it will not damage the precision threads of the thread gauge. The handle for holding the thread gauges will be made with a simple tapered bore in either end with vent holes in the side of the holder to allow trapped air between the gauge and the holder to escape. The protector will, therefore, double as both a protector and a jacking device for extracting the thread gauges from the handle when the size of gauge is to be changed. The protector will be simple and economical and, therefore, if an occasional protector is lost, there will be no serious consequences.

It is, accordingly, an object of this invention to overcome the difficulties and disadvantages in using and storing thread gauges and, more particularly, it is an object of this invention to provide a protector for a thread gauge which is simple in construction, economical to manufacture, and simple and efficient to use.

Another object of this invention is to provide an improved holder for thread gauges.

A further object of the invention is to provide an improved combination thread gauge holder and combination protector and thread gauge removing device.

A still further object of this invention is to provide an improved thread gauge protector.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 2:
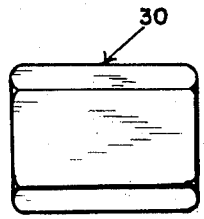

In the drawing:

Fig. 1 is a side view of a thread gauge holder with thread gauges in each end thereof and one of the improved protecting devices supported on one of the gauges according to the invention; and Fig. 2 is a side view of a protecting device according to the invention.

Now with more specific reference to the drawing, two thread gauges 10 and 11 are shown. The thread gauges 10 and 11 have tapered shanks 12 and 13, respectively, thereon which are preferably provided with a standard taper or other suitable taper and terminate in ends 14 and 15, respectively.

The shanks 12 and 13 are received in tapered bores formed in a handle 20a. The handle 20a is shown by way of example made of hexangular stock having tapered bores 18 and 19 formed in each end thereof. The tapered bores 18 and 19 are in the form of blind holes and do not extend through the entire length of the handle 20a. This results in a saving in machining during the manufacture of the device.

Lateral vent holes 20 and 21 communicate with the inner end of the bores 18 and 19 at 22 and 23, respectively, and vent any air trapped between the shanks 12 and 13 and the handle 20a during the insertion of the shanks and allow the trapped air to escape so that the tapered shanks 12 and 13 may be freely inserted into the tapered bores 18 and 19.

Male threads 25 and 26 on the thread gauges are precision ground threads for testing female threads. The thread gauges support a guard or protector 30 which may be made of aluminum, brass, copper, or other suitable soft material or even unhardened steel or a suitable plastic may be used so that the material of the protector 30 itself will not damage the threads. The outside surface of the protector 30 may be hexagonal or of a shape similar to the outer contour of the handle 20a. Threads 31 are formed in the guards 30. The threads 31 will be made of a size to freely mate with the threads on the thread gauges. One of the guards 30 will be provided for each of the thread gauges in a set and when the thread gauges of the set are stored in their repository, each guard 30 will remain in place on each thread gauge in the set.

When it is desired to remove one of the thread gauges from the handle 20a to replace it with a thread gauge of a different size, it is only necessary to tighten the guard 30 down against a surface 34. Therefore, the force exerted between the surface 34 and the end of the handle 20a will result in a jacking effect on the thread gauge and will easily pull the tapered shank thereon from the tapered bore 18. This feature eliminates the use of a drift tool which is commonly used for a corresponding purpose.

When the thread gauges are stored in their repository separate from the handle 20a or when they are in place on the handle 20a, the guards 30 will remain in place on the thread gauges. When the operator desires to use the thread gauges for testing threads, he merely removes the guard 30 on the gauge he intends to use and leaves the guard removed until he is ready to store the gauge or lay it aside temporarily.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

In combination, a thread gauge, a handle for said thread gauge, and a protector, said thread gauge having a gauging portion and a tapered shank portion integrally connected together, said gauging portion having a precision external thread formed thereon and extending to the distal end thereof, said handle having a tapered bore therein increasing in size toward the outer end thereof and forming a counterpart of said shank portion and frictionally receiving said shank portion, said protector being made of a material softer than the material of said thread gauge and being hollow and internally threaded and disposed on said threaded gauging portion, said threaded protector engaging an end of said handle adjacent the larger end of said bore, said protector being rotatable to exert a force on the end of said handle to remove said shank portion from said handle.

References Cited in the file of this patent

UNITED STATES PATENTS

| | | |
|---|---|---|
| 388,987 | McIntyre | Sept. 4, 1888 |
| 1,438,634 | Clifford et al. | Dec. 12, 1922 |
| 1,455,973 | Sikorovsky | May 22, 1923 |
| 2,536,225 | Rice | Jan. 2, 1951 |